(12) United States Patent
Suess et al.

(10) Patent No.: US 11,867,899 B1
(45) Date of Patent: Jan. 9, 2024

(54) FIELD-OF-VIEW COMPRESSION OPTICS FOR ANGLE TOLERANT ELECTRO-OPTIC MODULATORS

(71) Applicant: Amazon Technologies, Inc., Seattle, WA (US)

(72) Inventors: Ryan J. Suess, Seattle, WA (US); Joseph Andrew Summers, Seattle, WA (US); Aleksandar Kojic, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 600 days.

(21) Appl. No.: 16/916,501

(22) Filed: Jun. 30, 2020

(51) Int. Cl.
| | |
|---|---|
| *G01S 17/10* | (2020.01) |
| *G01S 17/89* | (2020.01) |
| *G02F 1/01* | (2006.01) |
| *G02B 27/00* | (2006.01) |
| *G01S 7/481* | (2006.01) |

(52) U.S. Cl.
CPC ........ *G02B 27/0081* (2013.01); *G01S 7/4814* (2013.01); *G01S 17/10* (2013.01); *G01S 17/89* (2013.01); *G02F 1/0136* (2013.01)

(58) Field of Classification Search
CPC ............ G02B 27/0081; G02B 27/0172; G02B 2027/0178; G02B 2027/0125; G02B 2027/0174; G02B 2027/0123; G02B 27/283; G02B 27/286; G02B 27/0101; G01S 7/4814; G01S 17/10; G01S 17/89; G02F 1/0136
See application file for complete search history.

(56) References Cited

U.S. PATENT DOCUMENTS

| | | | |
|---|---|---|---|
| 2019/0208183 A1* | 7/2019 | Schmidt | ............... H04N 13/254 |
| 2020/0326563 A1* | 10/2020 | Suess | .................... G01S 7/4816 |
| 2021/0389434 A1* | 12/2021 | Wang | ...................... G01S 17/42 |

OTHER PUBLICATIONS

Peng Zhang, Xiaoping Du, Jiguang Zhao, Yishuo Song, and Hang Chen, "High resolution flash three-dimensional LIDAR systems based on polarization modulation," Applied Optics, vol. 56, Issue 13, pp. 3889-3894 (2017).

Zhen Chen, Bo Liu, Shengjie Wang, and Enhai Liu, "Polarization-modulated three-dimensional imaging using a large-aperture electro-optic modulator", Appl. Opt. 57, 7750-7757 (2018) (abstract).

* cited by examiner

*Primary Examiner* — Mustak Choudhury
(74) *Attorney, Agent, or Firm* — Eversheds Sutherland (US) LLP (57) ABSTRACT

A light detection and ranging (LIDAR) system that provides a large field-of-view (FOV) includes an angle tolerant birefringent electro-optic shutter, an optical system, and one or more image sensors. The electro-optic shutter includes a birefringent material. The optical system is configured to receive optical pulses that are reflected from an environment and that include a first set of angles. The optical system is configured to compress the first set of angles into a second set of angles below a threshold angle associated with the birefringent material. The electro-optic shutter is configured to receive the optical signals with the second set of angles. The image sensor(s) are configured to generate an image of the environment based on the optical pulses with the second set of angles that pass through the electro-optic shutter.

17 Claims, 9 Drawing Sheets

FIELD-OF-VIEW COMPRESSION OPTICS FOR ANGLE TOLERANT ELECTRO-OPTIC MODULATORS

BACKGROUND

The present invention relates to light detection and ranging (LIDAR) systems, and more specifically, to a LIDAR system that employs electro-optic materials and compression optics to achieve a large field-of-view.

LIDAR (also referred to as LiDAR and LADAR) is a technique that is often employed to obtain range or depth information about a target and generate three-dimensional (3D) images (or maps) of the target. For example, a LIDAR system typically measures distance to a target by illuminating the target with pulsed laser light and measuring the reflected pulses with a sensor. The reflected pulses are then used to generate 3D images. LIDAR systems are used in a variety of applications in which accurate range information about a target is needed. For example, using the data collected by a LIDAR system, it is possible to perform terrestrial mapping, target detection and recognition, obstacle detection and avoidance, 3D object capture, component inspection, etc.

Two conventional techniques that LIDAR systems typically employ to obtain 3D images include a scanning technique and a flash technique. The scanning technique uses one or a more detector pixels and a scanner to acquire 3D images. For example, in the scanning technique, multiple laser pulses are sent out from a laser system, and each laser pulse is directed to a different point on the target by a scanner. The time-of-flight (ToF) (of the reflected pulse) is then obtained for each target point, using a single detector pixel. The flash technique, in contrast, uses an array (e.g., two-dimensional (2D)) detector and a single laser pulse to illuminate the entire target and acquire 3D images.

BRIEF DESCRIPTION OF DRAWINGS

Various embodiments in accordance with the present disclosure will be described with reference to the drawings, where like designations denote like elements.

DETAILED DESCRIPTION

Some flash LIDAR systems employ optical shutters (e.g., optical polarization modulators) to obtain 3D images. In a shutter-gated flash LIDAR system, for example, scattered (e.g., reflected) light pulses from a target pass through an optical shutter (as it is transitioning from an "off" state to an "on" state) and are acquired by a detector. In some schemes, the optical shutter modifies the polarization state of the scattered returned light after it has passed through a linear polarizer. The light with the modified polarization state is analyzed by another polarizer before being detected, thus converting the light with the modified polarization state to light with a measurable intensity modulation.

One issue with shutter-gated flash LIDAR systems is that the native birefringence of the electro-optic (EO) elements (or components or materials), which enable the optical shutter, can impact the useful field-of-view (FOV) of such systems. As light passes through the optical shutter, the native birefringence (e.g., optical birefringence when inactive or when no field is applied) of the EO elements produces interference patterns, such as interference fringes, into the detected image.

These interference patterns limit the useful FOV through the optical shutter to small angles (e.g., angles below a certain degree threshold that is associated with the EO material within the optical shutter). For example, the native birefringence of some first-order EO materials (also referred to as Pockels cells), such as potassium dihydrogen phosphate (KDP) crystals or potassium dideuterium (KD*P) crystals, may produce interference patterns that significantly limit the usable FOV through the optical shutter to a few degrees. In another example, the native birefringence of other first-order EO materials, such as lithium tantalate ($LiTaO_3$), may produce interference patterns that limit the usable FOV through the optical shutter to a few tens of degrees (e.g., below 40°, equivalently ±20°). Thus, even in optical shutters that have been engineered for wide FOV operation, the native birefringence of the EO materials can impact the useful FOV of such systems. Other materials with a native birefringence that can limit the FOV of LIDAR include, but are not limited to, lithium niobate ($LiNbO_3$), cadmium telluride (CdTe), and beta barium oxide (BBO). This limited FOV makes shutter-gated flash LIDAR systems impractical for many LIDAR applications, including, for example, short range applications (e.g., within approximately 10 meters).

To address this, embodiments herein describe a LIDAR system that can achieve a significantly higher FOV (e.g., 120° and greater) than conventional LIDAR systems with optical shutters. More specifically, embodiments can achieve a high FOV by using an optical system (e.g., one or more lenses) to compress reflected light within a large range (or set) of angles into a smaller range (or set) of angles, such that an interference pattern is not produced (or generated) when the light (within the smaller range of angles) propagates through the optical shutter (with the birefringent EO material).

In one embodiment described in more detail below, the optical system can compress a large range of angles (representative of the input FOV), such that the equivalent (compressed) range of angles incident on the optical shutter is below a threshold angle (e.g., degree threshold) associated with the EO material of the optical shutter. The threshold angle, for example, may be set to an angle at or below a maximum angle associated with the EO material that can propagate through the birefringent EO material of the optical shutter without producing an interference pattern. In one embodiment, the FOV can be significantly increased (e.g., to 120° and greater) by disposing the optical system adjacent to a front (e.g., input) side of the optical shutter, such that the reflected light (from the scene) enters the optical system prior to entering the optical shutter. In another embodiment, the FOV can be significantly increased (e.g., to 120° and greater) by disposing the optical shutter between one or more lenses of the optical system. As described below, the lenses of the optical system may include one or more fisheye lenses.

While many embodiments use flash LIDAR as an example of an application in which the techniques presented herein can be used, embodiments are not limited to flash LIDAR and can be used for other applications. Such applications, for example, can include, but are not limited to, high speed photography/metrology, pointing error and turbulence tolerant free-space optical communications, etc.

Figure 1:
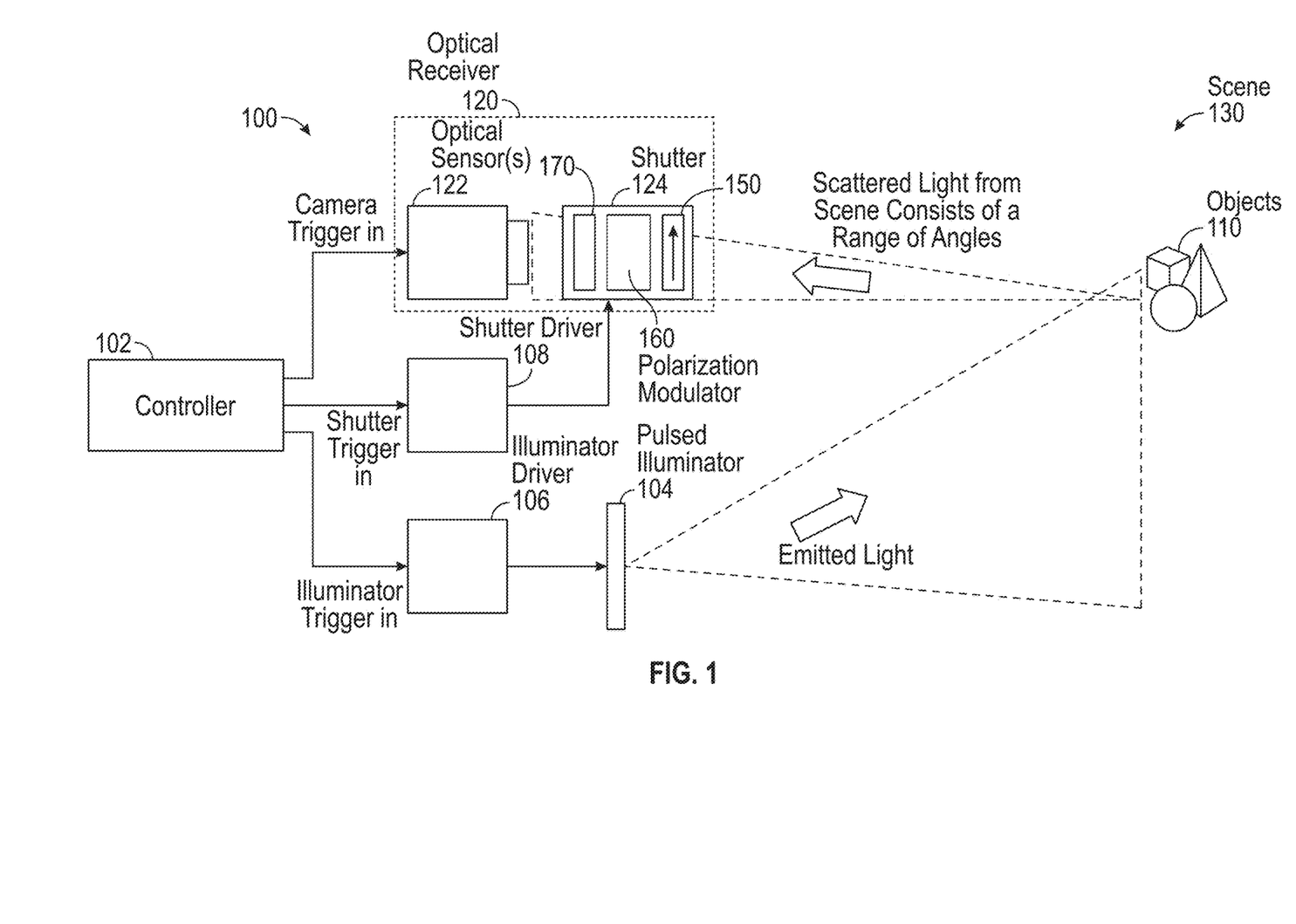
FIG. 1 is a block diagram illustrating a LIDAR system, according to one embodiment.

FIG. 1 is a block diagram illustrating a LIDAR system 100, according to one embodiment. In one embodiment, the LIDAR system 100 is implemented as a polarization-modulated flash LIDAR system. As shown, the LIDAR system 100 includes a controller 102, an illuminator driver 106, a shutter driver 108, and an optical receiver 120. The optical receiver 120 includes one or more optical sensors 122 and a (optical) shutter 124. The controller 102, illuminator driver 106, shutter driver 108, optical sensor(s) 122, and the shutter 124 can include hardware components, software modules, or combinations thereof. Although depicted separately, in one embodiment, the controller 102, illuminator driver 106, and the shutter driver 108 can be implemented by a single component, e.g., with clock circuitry, pulse (generator) circuitry, delay pulse generator circuitry, driver circuitry, power supply, and/or similar control components to trigger operation of component(s) of the LIDAR system 100. In general, the controller 102, illuminator driver 106, and the shutter driver 108 can be implemented with any number of components (e.g., more than three components).

The controller 102 is representative of a variety of computing devices (or systems), including a laptop computer, mobile computer (e.g., a tablet or a smartphone), microcontroller or other embedded system, server, etc. The controller 102 is configured to control operation of the optical sensor (s) 122, the shutter 124 (e.g., via the shutter driver 108), and the pulsed illuminator 104 (e.g., via the illuminator driver 106). For example, the controller 102 can generate and apply electrical signals (e.g., control and/or clock signals) to the illuminator driver 106, the shutter driver 108, and the optical sensor(s) 122.

The pulsed illuminator 104 is configured to transmit (or emit or output) a light pulse (or beam) to the scene (or target) 130. In one embodiment, the pulsed illuminator 104 is a laser array. More generally, the pulsed illuminator 104 can be any type of laser/light source. The light pulse may include a laser pulse, light emitting diode (LED) pulse, etc. More generally, a light pulse may also be referred to as a beam, an optical pulse, an optical signal, an optical waveform, etc. In one example, the controller 102 sends a control signal (e.g., "illuminator trigger") to the illuminator driver 106 to trigger the pulsed illuminator 104 to transmit a light pulse to the scene 130. The controller 102 can generally configure the repetition rate, energy, and duration of the light pulse that is output from the pulsed illuminator 104.

Although not shown, in some embodiments, the light pulse that is output from the pulsed illuminator 104 may pass through TX optics (e.g., lens, mirrors, diffusers, etc.) before reaching the scene 130. In one reference example, the TX optics can include a set of collimating lenses and an optical diffuser (e.g., rotating diffuser, holographic diffuser, etc.) to provide laser speckle reduction (e.g., reduce coherent artifacts from the light illumination). In some cases, the optical diffuser can be placed at the focal point of the collimating lenses. In some cases, the optical diffuser can be placed over the emitting elements (e.g., LED or vertical-cavity surface-emitting lasers (VCSEL) array). In addition to speckle reduction, the optical diffuser can be used to create an even light field when an array of emitting elements is used. In another reference example, assuming pulsed illumination from a LED is used for the LIDAR system 100, the TX optics may not include a diffusing element.

The light pulse output from the pulsed illuminator 104 is directed to the scene 130 and reflected by one or more objects 110 in the scene 130. That is, the objects 110 each correspond to a different reflection of the pulsed light emitted by the pulsed illuminator 104. The reflected (or backscattered) light pulses from the objects 110 are received by the optical receiver 120, which is generally configured to detect incoming optical signals (e.g., reflected light from the scene 130) and extract information from the optical signals. In one embodiment, the optical receiver 120 may be a polarization-modulation based optical receiver.

The shutter 124 may receive the reflected light pulses from the scene 130. The shutter 124 includes a linear polarizer 150, a polarization modulator 160, and an analyzing polarizer 170. In some embodiments, the linear polarizer 150 filters out any received light that does not have a predefined polarization (e.g., a linear polarization in a particular direction). In one particular example, the linear polarizer 150 may permit light with only a vertical polarization (e.g., a polarization in the page) to pass through. That is, the linear polarizer 150 is generally used to reject unwanted polarized light from the reflected light pulses so that light entering the shutter 124 has the same initial polarization. For example, assuming the linear polarizer 150 is configured parallel to the emitted linear polarized light (of the light pulse), the linear polarizer 150 can filter out unwanted polarized light to output only linear polarized light parallel to the emitted linear polarized light.

The polarization modulator 160 (e.g., Pockels cell) is arranged at an output of the linear polarizer 150 and is configured to change the polarization of incident light. As used herein, a polarization modulator may also be referred to as a polarization rotator, a tunable waveplate, a modulation cell, etc. In this embodiment, the linearly polarized light can pass through the polarization modulator 160 in the shutter 124, and the polarization modulator 160 can selectively change the polarization of the reflections received from the objects 110. In one embodiment, the polarizations of the reflections are changed to different values depending on the distances the objects 110 are from the LIDAR system 100 and the time at which the reflections arrive at the LIDAR system 100. That is, the reflection caused by a first object 110 may have a different polarization after passing through the polarization modulator 160 than the reflection caused by a second object 110. Put differently, when the reflected light pulses reach the polarization modulator 160 of the shutter 124, the reflected light pulses experience a time-of-incidence-dependent phase retardation and a corresponding change in their polarizations, based on a trigger from the controller 102 (and/or the shutter driver 108).

In some embodiments, the controller 102 (and/or shutter driver 108) may implement a delay pulse generator that triggers the polarization modulator 160 at a certain delay time ($\tau$) (e.g., after triggering the pulsed illuminator 104) to change the polarization state of the reflected light pulse. The controller 102 can trigger the polarization modulator 160 to change the polarization state by applying a time varying voltage, V(t), to the polarization modulator 160 during a modulating gate time, $T_G$. In some embodiments, the controller 102 can synchronize the pulsed illuminator 104 to the shutter 124 so that the reflections from the objects in the scene 130 are received while the phase retardation of the polarization modulator 160 changes monotonically. For example, the controller 102 can program the delay time, τ, to allow for detecting light that is reflected at different times. In some cases, τ can be programmed, such that the shutter 124 is triggered in time intervals $[\tau_1, \tau_1+T_G]$, $[\tau_2, \tau_2+T_G]$, etc. As used herein, each time interval $[\tau_i, \tau_i+T_G]$ (where $0 \geq \tau_i \leq T_G$) may be referred to as a gate time. By programming the delay time, τ, embodiments can allow for the scanning of multiple gate times over multiple cycles.

Figure 2A:
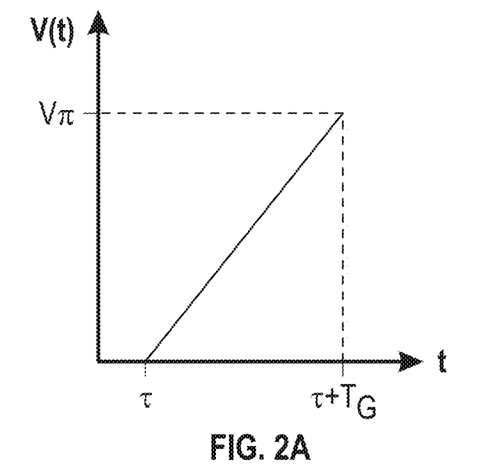
FIG. 2A is a graph of a voltage applied to a Pockels cell as function of time, according to one embodiment.
Figure 2B:
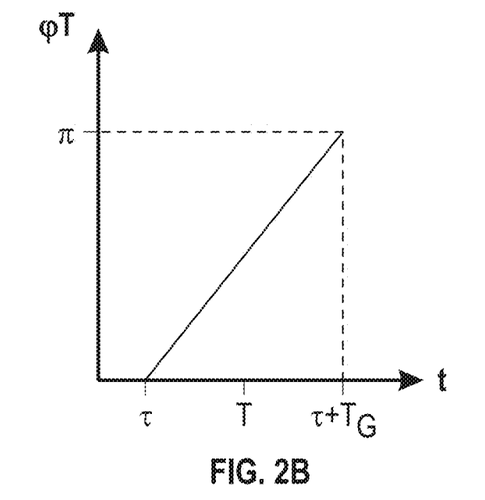
FIG. 2B is a graph of phase retardation of a light pulse as a function of time, according to one embodiment.

FIG. 2A illustrates a reference example of voltage applied to the polarization modulator 160 (e.g., a Pockels cell) as a function of time, according to one embodiment. When the controller 102 triggers the polarization modulator 160 (e.g., via the shutter driver 108), the voltage applied to the polarization modulator 160 begins to increase from zero voltage to the half-wave voltage $V_\pi$ (where $V_\pi$ is the half-wave voltage of a polarization modulator 160 having a first order EO effect (also known as the Pockels effect)). Because a phase retardation φ(t) is proportional to an applied voltage V(t), the applied voltage V(t) also triggers a change in the phase retardation φ(t). Note, in other embodiments, the bias voltage can increase from zero voltage to another voltage (e.g., set below $V_\pi$). For example, a DC bias or passive phase bias can be applied with a voltage swing set below $V_\pi$ in order to operate within more of the linear central region of the intensity modulator transfer function. As shown in FIG. 2B, as the reflected light pulse from scene 130 travels through the polarization modulator 160 during the gate time $T_G$, the reflected light pulse experiences a polarization-dependent phase retardation φ(t), and if a quarter-wave plate is placed after the polarization modulator 160, the linear polarization state is rotated by an angle θ(t). However, in other embodiments, no quarter-wave plate is used. In some embodiments, the time of flight (ToF) of the reflected light pulse can be determined from the polarization rotation angle of the reflected light pulse.

Note that while FIGS. 2A and 2B depict the bias voltage and phase retardation for a polarization modulator 160, respectively, as increasing linearly with respect to time, in other embodiments, the bias voltage and phase retardation for the polarization modulator 160 may have non-linear shapes (e.g., periodic or sinusoidal waveform). For example, in some cases, a periodic waveform can be used for the bias voltage that does not require the changing function of the polarization modulator 160 to be monotonic.

Referring back to FIG. 1, the analyzing polarizer 170 receives (from the polarization modulator 160) reflected light pulses with the modified polarization states and converts the reflected light pulses with the modified polarization states to light pulses that have a measurable intensity modulation. In one embodiment, the LIDAR system 100 can determine the range information based on the intensity of the reflected light pulse(s) measured by the optical sensor(s) 122. In particular, as the polarization state of the light exiting the polarization modulator 160 changes in time, the range can be obtained from detected intensities after passing through the analyzing polarizer 170, based on knowledge of the changing function (e.g., phase retardation) of the polarization modulator 160. In one embodiment, the optical sensor(s) 122 is an image (e.g., camera) sensor that acquires image information from reflected light of a scene 130 onto a set of pixels. The optical sensor(s) 122 can generally include any type of image sensor, examples of which include, but are not limited to, charged coupled device (CCD) image sensors, complementary metal-oxide-semiconductor (CMOS) image sensors, etc. In one example, the controller 102 sends a control signal (e.g., "camera trigger" or "master trigger") to the optical sensor(s) 122 to control operation of the optical sensor(s) 122.

In one embodiment, the optical receiver 120 includes a single optical sensor 122. For example, the single optical sensor 122 can be a detector having a polarizer grid that is patterned directly onto the optical sensor (e.g., micro polarizer array). In another embodiment, two optical sensors 122 can be used to obtain range information of the scene 130. For example, the two optical sensors 122 can measure the respective intensities of the polarized components, and use the intensity information to compute the ranges between the LIDAR system 100 and the objects 110 in the scene 130.

As noted above, one issue with polarization modulated-based flash LIDAR systems is that these systems use polarization modulators (e.g., polarization modulators 160) that are based on EO components (e.g., Pockels components) that have a native birefringence. Due to this native birefringence, the EO components typically generate interference patterns in the image detected by the optical sensor(s) 122, which, in turn, significantly reduces the useful FOV of polarization modulated-based flash LIDAR systems.

Figure 3:
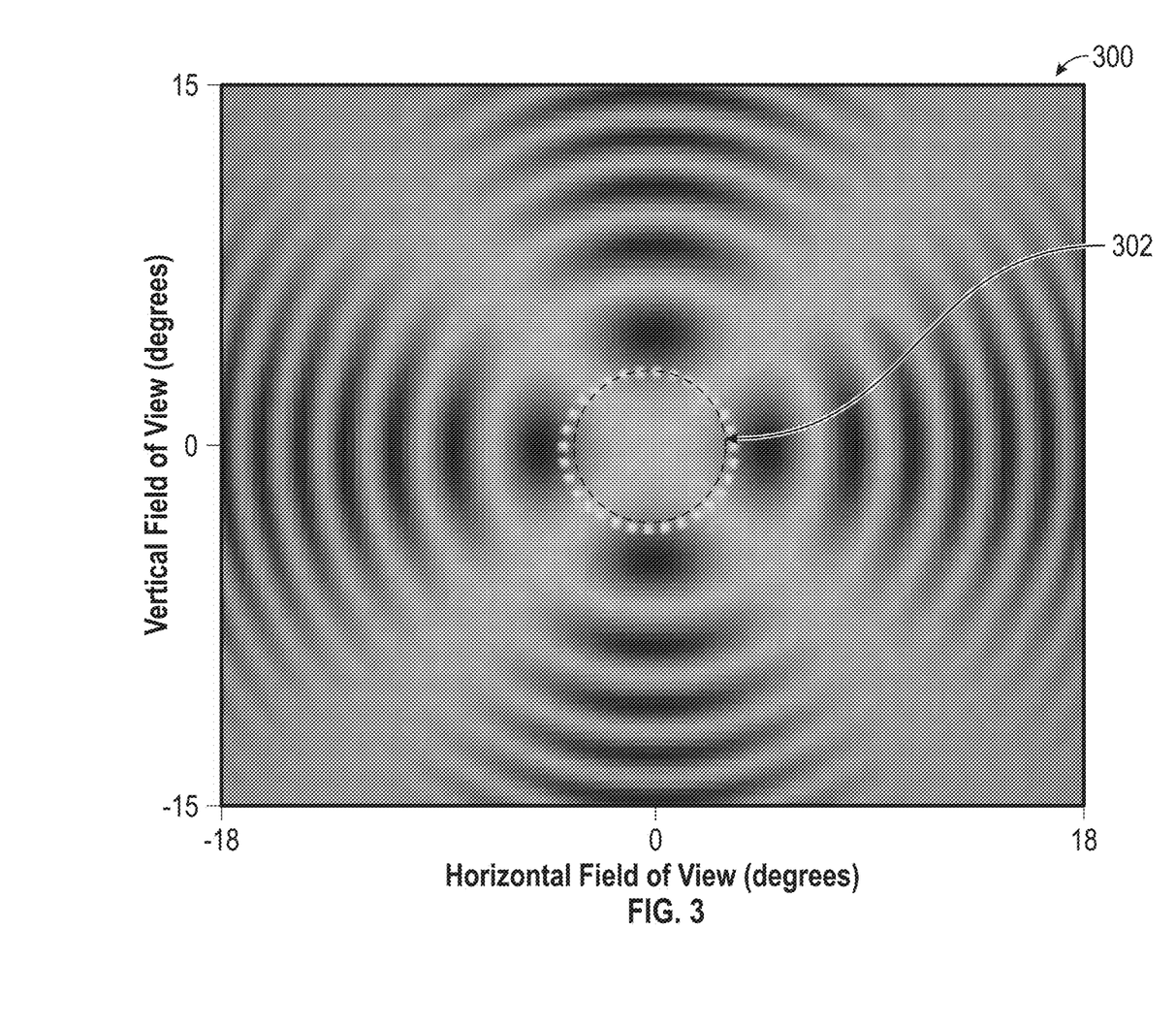
FIG. 3 illustrates an image formed using a polarization modulator, according to one embodiment.

FIG. 3, for example, illustrates an image 300 formed using a KDP-based polarization modulator 160, according to one embodiment. In particular, image 300 is a simulated image of light passing through a birefringent material (e.g., KDP) that is disposed between crossed polarizers. Due to the native birefringence, an interference pattern forms in the image 300 that reduces the useful FOV to a few degrees. Here, the useful FOV is represented by line 302, which shows an interference free region that is a few degrees wide. In some embodiments, the useful FOV can be increased (e.g., up to nearly 40°) by, in part, using EO materials that have a low native birefringence (e.g., below or equal to a predefined amount of birefringence) and making the EO material thin (e.g., below or equal to a predefined thickness). In one embodiment, for example, the useful FOV can be increased (e.g., up to 40°) by using an EO material, such as $LiTaO_3$. However, even with EO materials that have a low native birefringence, the useful FOV may be significantly below the input FOV of the reflected light pulses from the scene, e.g., which can consist of a wide range of angles (e.g., 120° and greater). This FOV limitation, thus, makes LIDAR impractical for many applications where a large FOV is required.

Embodiments herein mitigate FOV limitations associated with conventional polarization-modulation-based flash LIDAR systems by using an optical system (with one or more fisheye lens) to compress the input range of angles of the reflected light pulses from the scene 130 into a smaller range of angles, which are at or below a maximum angle that can propagate through the birefringent EO material of the polarization modulator 160 without producing an interference pattern in a detected image.

Figure 4:
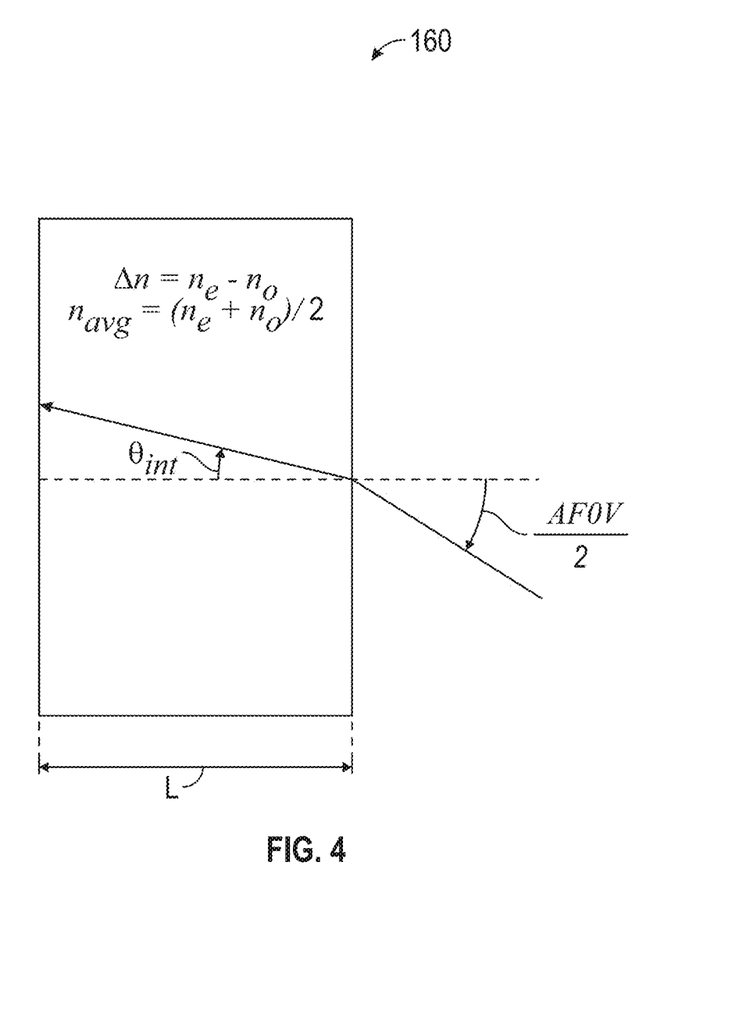
FIG. 4 depicts an example of maximum angular field-of-view as a function of crystal length and birefringence of an electro-optic material, according to one embodiment.

As noted, the maximum angle that can propagate through a birefringent EO material without producing an interference pattern in a detected image may be based in part on the birefringent EO material. FIG. 4 depicts one example of determining the maximum angular field-of-view (AFOV) (also referred to as FOV) as a function of crystal length, L, and birefringence, Δn, of the crystal (or EO material), according to one embodiment. In this particular example, the crystal or EO material may be included within the polarization modulator 160. Here, the maximum AFOV for an active material of length L and birefringence Δn may be determined according to the following:

$$\theta_{int} < \cos^{-1}\left(\frac{1}{\frac{\lambda}{2L\Delta n}+1}\right) \quad (1)$$

where $$n_{avg}\sin\theta_{int} = \sin\frac{AFOV}{2}$$

(e.g., Snell'S Law), $\Delta n = n_e - n_o$, $n_{avg} = (n_e + n_o)/2$, $\theta_{int}$ is the angle of refraction, $n_e$ is the extraordinary refractive index of the material, and $n_o$ is the ordinary refractive index of the material. More details describing the association of crystal properties and the AFOV can be found in U.S. patent application Ser. No. 16/383,258, filed Apr. 12, 2019, which is expressly incorporated by reference herein. Note, however, that FIG. 4 depicts merely one example of determining the maximum FOV of an EO material and that other techniques can be used to determine the maximum FOV.

Figure 5:
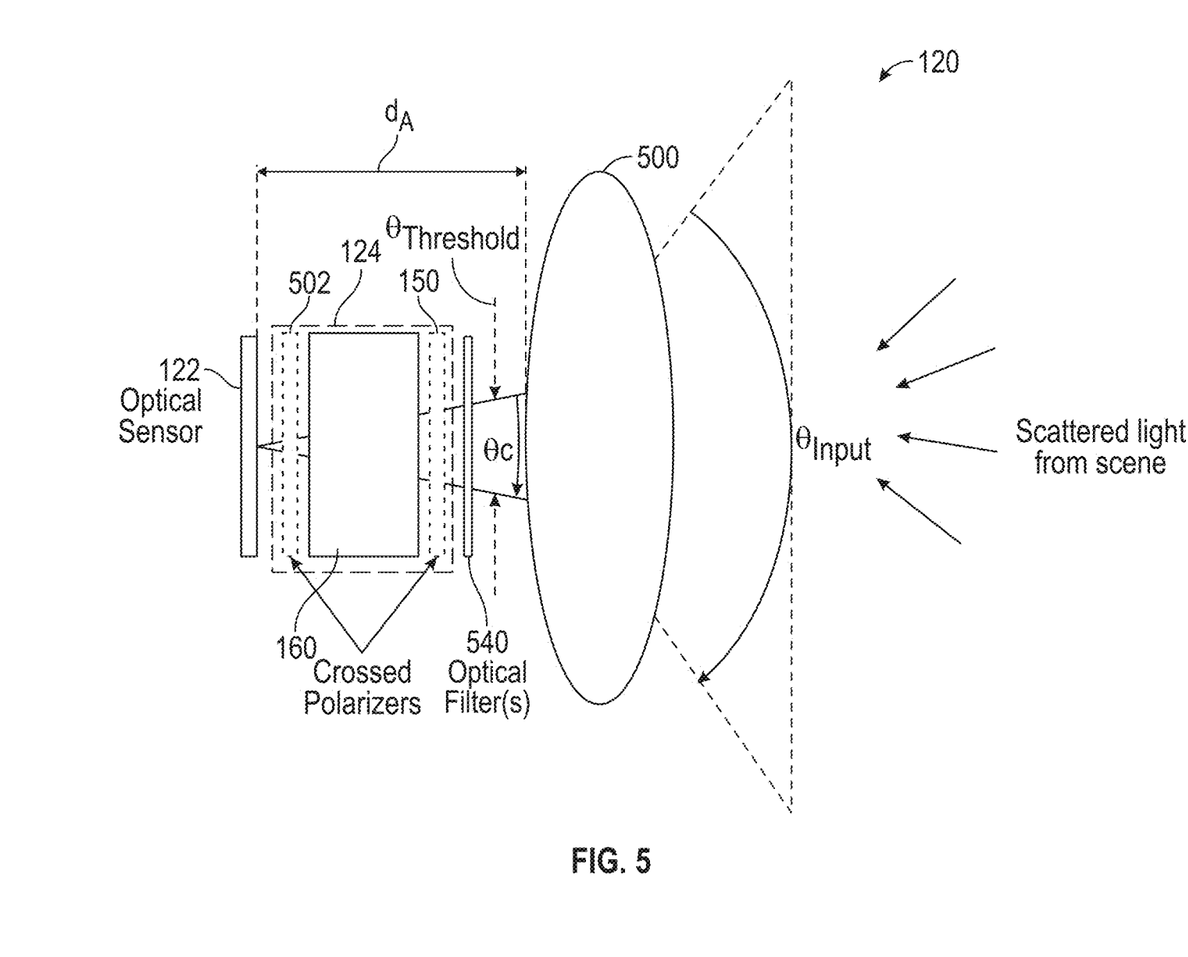
FIG. 5 illustrates an example optical receiver with an optical system, according to one embodiment.

In one embodiment, the FOV can be significantly increased (e.g., to 120° and greater) by disposing the optical system adjacent to a front (input) side of the shutter 124, such that the reflected light (from the scene) enters the optical system prior to entering the (polarization modulator 160 of the) shutter 124. FIG. 5 illustrates an example optical receiver 120 that includes an optical system 500 arranged at an input side of the shutter 124, according to one embodiment. Here, the optical system 500 receives reflected light from the scene 130 having a first set of angles (e.g., $\theta_{input}$). The optical system 500 is configured to (1) compress the first set of angles (e.g., $\theta_{input}$) into a second set of angles (e.g., $\theta_c$) below a threshold angle (e.g., $\theta_{threshold}$), where $\theta_{input} > \theta_c$ and $\theta_c < \theta_{threshold}$ and (2) allow for a minimum gap distance $d_A$ between the optical sensor 122 and the optical system 500.

The optical system 500 may include a lens system with multiple lenses. For example, the lens system may include a first set of lenses that perform compression (e.g., compressing the first set of angles into the smaller second set of angles), a second set of lenses that correct or mitigate distortions or aberrations in the output of the first set of lenses, and a third set of lenses that are image forming lenses (e.g., lenses used to form an image of the light output from the second set of lenses onto an image plane of the optical sensor(s)). The first set of lenses may include a negative meniscus lens(es). In one embodiment, the lens system may also include one or more fisheye lenses.

In some embodiments, the optical receiver 120 may additionally include an optical filter(s) 540 arranged at an output of the optical system 500 and at an input of the shutter 124. In this case, the reflected light pulses (having the second set of angles) may be initially received at the optical filter(s) 540. The optical filter(s) 540 may be configured to filter out light that has a wavelength or frequency that is different from the wavelength or frequency of the light emitted by the pulsed illuminator 104. For example, if the pulsed illuminator 104 emits light with a 940 nm wavelength, the optical filter(s) 540 can remove any light that has a frequency greater than or less than this wavelength (within some tolerance (e.g., +/−5%) so the filtered light has substantially the same wavelength as the emitted pulses). This permits the reflected laser pulses to enter into the shutter 124 while removing light at different wavelengths.

As noted, $\theta_{threshold}$ may be based on the particular EO material used for the polarization modulator 160. For some first-order EO materials, such as KDP, $\theta_{threshold}$ may be a few degrees (e.g., ~1.5°). For other first-order EO materials, such as LiTaO$_3$, $\theta_{threshold}$ may be a few tens of degrees (e.g., below 40°, or equivalently ±20°). In general, $\theta_{threshold}$ may be set to an angle at or below a maximum angle (associated with the EO material) that can propagate through the polarization modulator 160 without producing an interference pattern. The minimum gap distance (or length) ($d_A$) may be a distance that is sufficient to accommodate the optical filter(s) 540, the components (e.g., linear polarizer 150, polarization modulator 160, and the polarizer 502) of the shutter 124.

In this embodiment, the polarizer 502 may be an analyzing polarizer (e.g., analyzing polarizer 170) that converts the reflected light signals with the modulated polarization states into reflected light signals that have a measurable intensity modulation. The light signals that pass through the polarizer 502 can be detected by the optical sensor 122. In one embodiment, the polarizer 502 may be a polarizer grid (e.g., micro polarizer array). In this embodiment (not shown in FIG. 5), the polarizer 502 may be arranged adjacent to the optical sensor 122, such that the polarizer 502 is patterned directly onto the optical sensor 122. However, note that FIG. 5 depicts merely a reference example of an optical receiver 120 that can include an optical system 500 and that the optical system 500 can be used within other optical receiver configurations.

Figure 6:
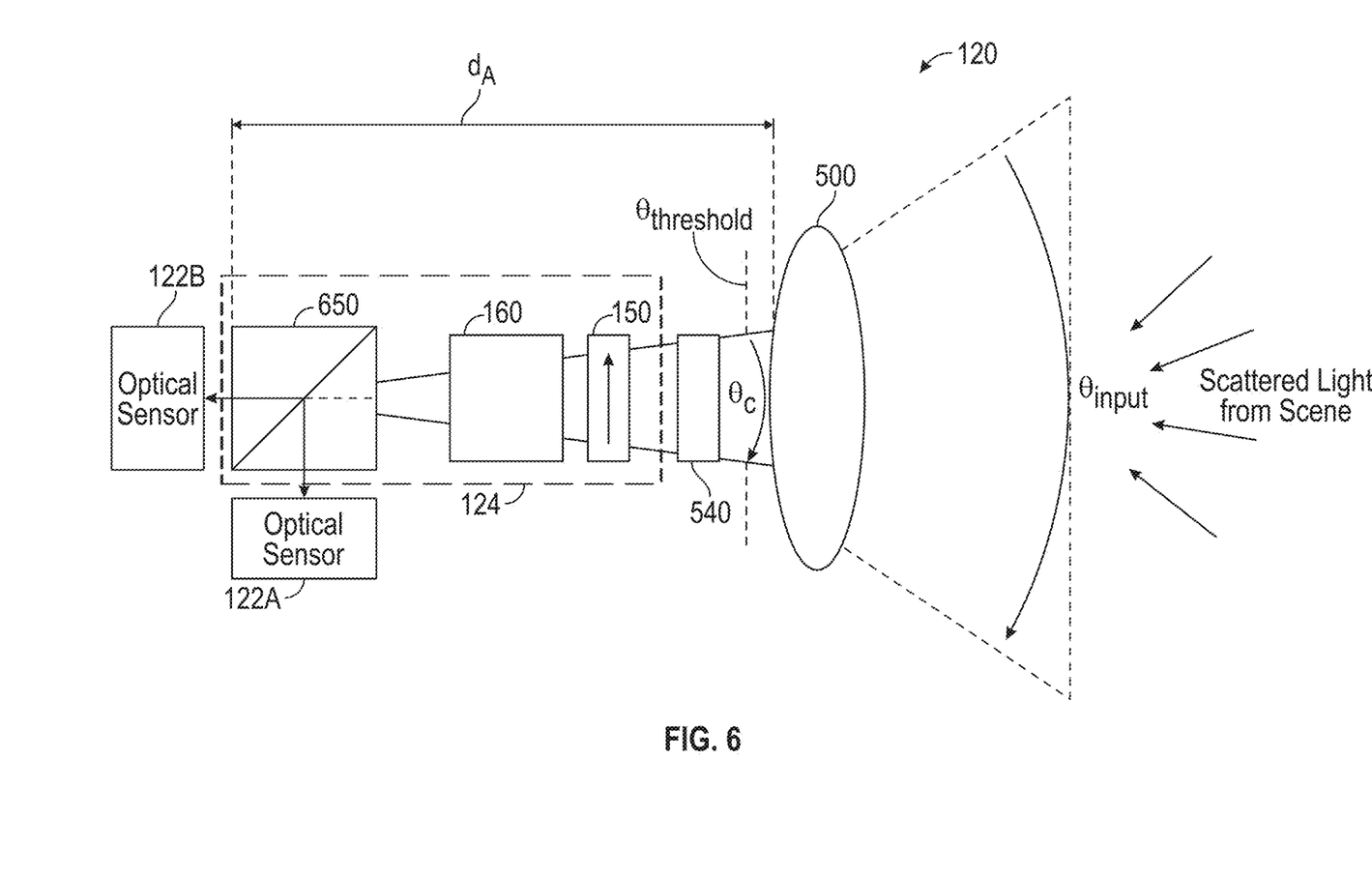
FIG. 6 illustrates another example optical receiver with an optical system, according to one embodiment.

FIG. 6, for example, depicts another embodiment of the optical receiver 120, which includes a polarizing beam splitter 650 (also referred to as a beam splitter, beam cube, etc.) as an analyzing polarizer (e.g., analyzing polarizer 170) and two optical sensors (e.g., optical sensors 122A and 122B). In this embodiment, as the polarization state of the light exiting the polarization modulator 160 changes in time, the range can be obtained from detected intensities after the analyzing polarizer (e.g., polarizing beam splitter 650) and knowledge of the changing function (e.g., phase retardation) of the polarization modulator 160. For example, after reflected light is linearly polarized using a linear polarizer 150, the polarization modulator 160 modifies the linear polarization based on its time of flight (ToF)—i.e., when the reflections are received at the LIDAR system 100. Optionally, the optical receiver 120 can include a quarter waveplate (not shown) that converts a generally elliptical polarization output by the polarization modulator 160 into a linear polarization. Next, the polarizing beam splitter 650 splits the linearly polarized light between two different optical sensors 122. In particular, a first polarized component (e.g., s-polarized light) can be sent to (or detected by) a first optical sensor 122A (e.g., the s-channel) and a second orthogonally polarized component (e.g., p-polarized light) can be sent to (or detected by) a second optical sensor 122B (e.g., the p-channel). Note, however, this is merely an example and that, in other embodiments, the LIDAR system 100 may include other types of analyzing polarizers that may behave differently.

The optical sensors 122 A-B (e.g., image sensors) measure the respective intensities of the polarized components, and use the intensity information to compute the ranges between the LIDAR system 100 and the objects 110 in the scene 130. For example, the relative intensities of the light at the optical sensors 122 A-B can be used to extract the polarization angle. In the embodiment of the optical receiver 120 illustrated in FIG. 6, the minimum gap distance $d_A$ may be a distance that is sufficient to accommodate the optical filter(s) 540, the linear polarizer 150, the polarization modulator 160, and the polarizing beam splitter 650.

Figure 7:
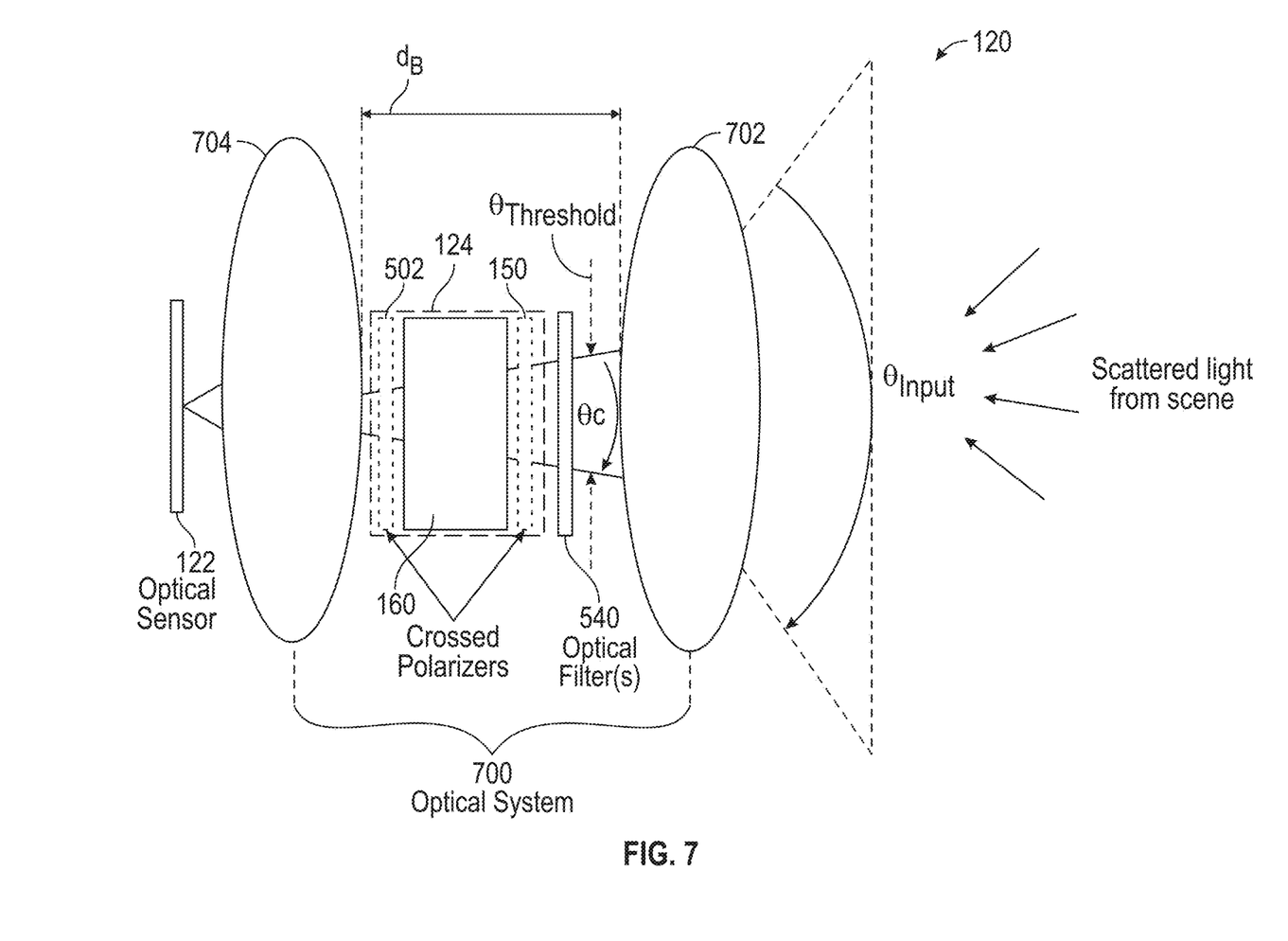
FIG. 7 illustrates another example optical receiver with an optical system, according to one embodiment.

In another embodiment, the FOV can be significantly increased (e.g., to 120° and greater) by disposing the shutter 124 between one or more lenses of the optical system. FIG. 7 illustrates an example optical receiver 120 that includes the shutter 124 disposed between lenses 702, 704 of an optical system 700. Similar to the optical system 500, the optical system 700 may be configured to (1) compress the first set of angles (e.g., $\theta_{input}$) of the received reflected light signals into a second set of angles (e.g., $\theta_c$) below a degree threshold (e.g., $\theta_{threshold}$), where $\theta_{input} > \theta_c$ and $\theta_c < \theta_{threshold}$ and (2) allow for a minimum gap distance dB between the len(es) 704 and 702 of the optical system 700.

In this embodiment, the lens(es) 702 may be used to compress the reflected light pulses having the first set of angles into the second set of angles. For example, the len(es) 702 may include a set of lenses (referred to as negative meniscus lenses) that are used to compress the input set of angles of the reflected light signals. The lens(es) 702 may also include a second set of lens(es) used to correct or mitigate distortions or aberrations in the output of the first set of lenses. In one embodiment, the lens(es) 702 may include one or more fisheye lenses. In one embodiment, the shutter 124 may be disposed in an afocal portion of the lens(es) 702. The lens(es) 704 may be image forming lenses used to form an image of the light pulses that pass through the shutter 124 in an image plane of the optical sensor 122. In some embodiments, the optical system 120 illustrated in FIG. 7 may additionally include the optical filter(s) 540 arranged at an output of the lens(es) 702 of the optical system 700 and at an input of the shutter 124.

Figure 8:
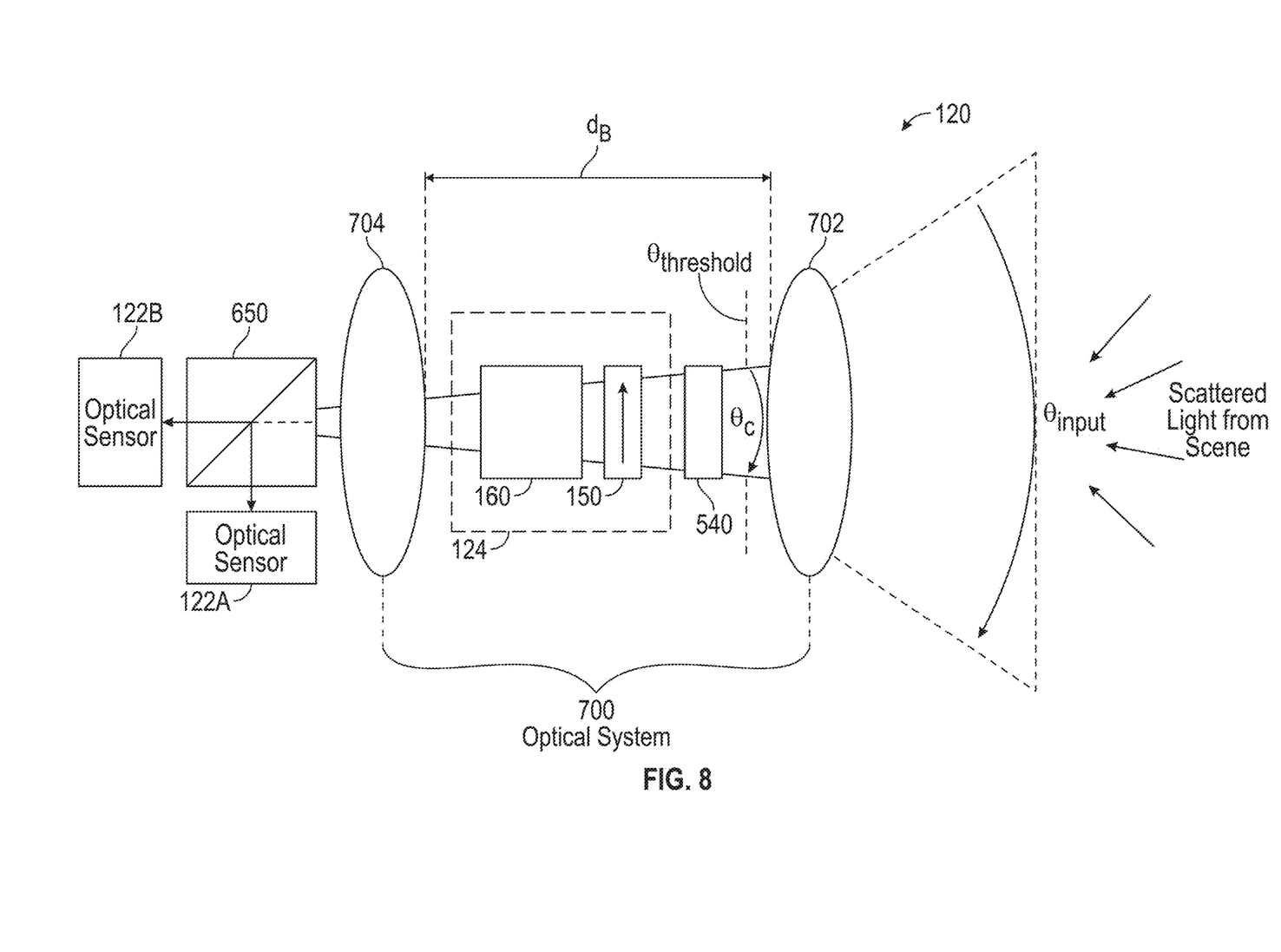
FIG. 8 illustrates another example optical receiver with an optical system, according to one embodiment.

Note that FIG. 7 depicts merely a reference example of an optical receiver 120 that can include an optical system 700 and that the optical system 700 can be used within other optical receiver configurations. FIG. 8, for example, depicts another embodiment of the optical receiver 120, which includes the polarizing beam splitter 650 as an analyzing polarizer (e.g., analyzing polarizer 170) and two optical sensors (e.g., optical sensors 122A and 122B).

Figure 9:
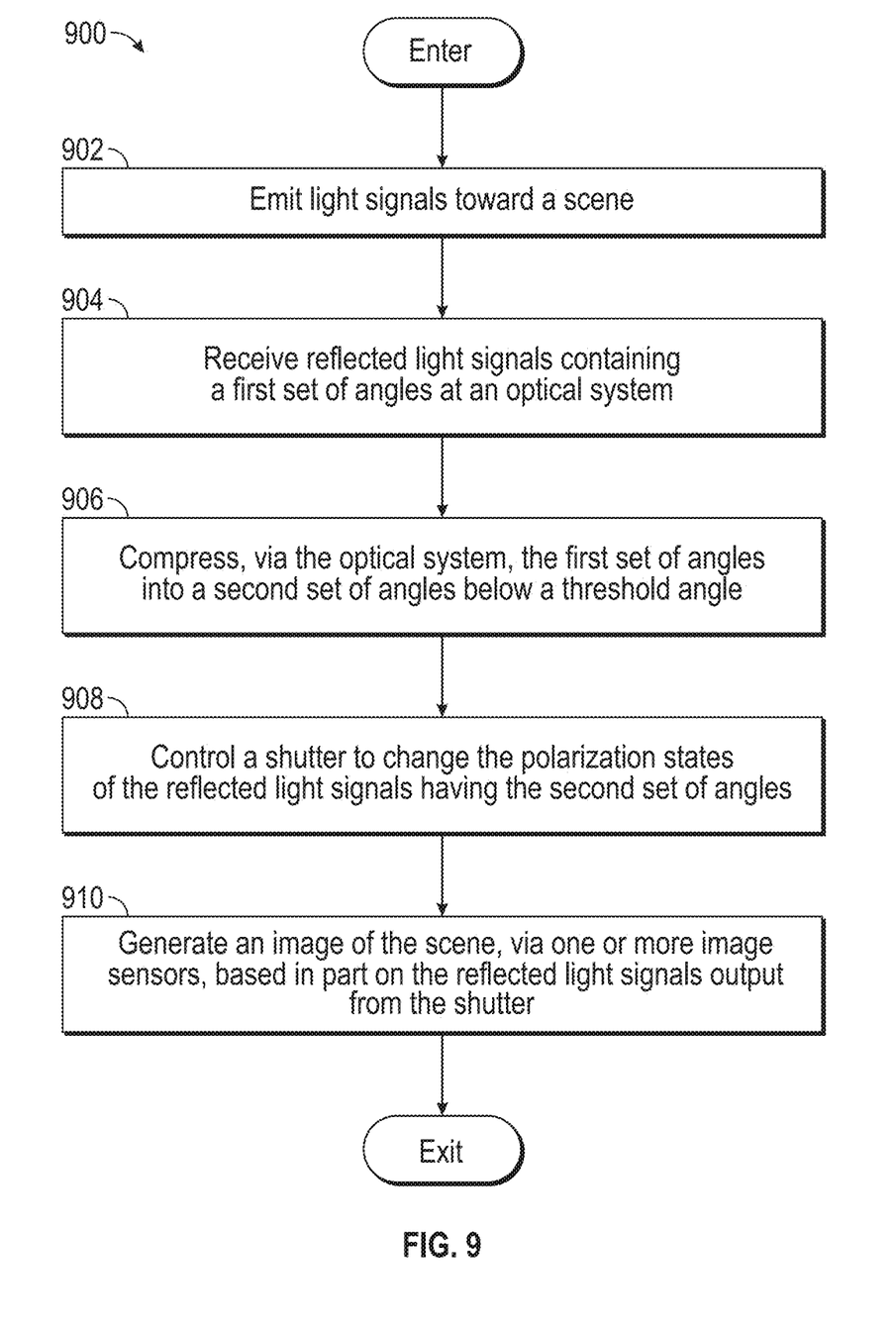
FIG. 9 is a flowchart of a method for using an optical system to increase the field-of-view of a LIDAR system, according to one embodiment.

FIG. 9 is a flowchart of a method 900 for using an optical system to increase the FOV of a polarization-modulation-based flash LIDAR system (e.g., LIDAR system 100), according to one embodiment. The method 900 may be performed by one or more components of the LIDAR system 100.

Method 900 may enter at block 902, where the LIDAR system emits one or more light signals (e.g., light pulses emitted from pulsed illuminator 104) towards a scene (e.g., scene 130). At block 904, the LIDAR system receives reflected light signals (from the scene) containing a first set of angles at an optical system. At block 906, the LIDAR system, via the optical system, compresses the first set of angles into a second set of angles, such that the range of angles incident on the shutter (e.g., shutter 124) of the LIDAR system is below a threshold angle associated with the EO material of the shutter. In one embodiment, the threshold angle is set to an angle at or below a maximum angle that can propagate through the birefringent EO material of the shutter without producing an interference pattern. In one embodiment, the first set of angles may contain one or more angles that are above the threshold angle.

At block 908, the LIDAR system controls the shutter to change the polarization state of the reflected light signals having the second set of angles. For example, as noted, the LIDAR system may cause the polarization modulator to selectively change the polarization of the reflected light signals as they propagate through the polarization modulator. At block 910, the LIDAR system generates an image of the scene, via one or more image sensors (e.g., optical sensors 122), based in part on the reflected light signals output from the shutter. For example, the LIDAR system may include another polarizer that receives the polarized light signals with the modified polarization states and outputs intensity modulated light signals. The LIDAR system can then measure intensities of components of the intensity modulated light signals via one or more image sensors, and determine range information of the scene based on the measured intensities. The LIDAR system can generate the image of the scene based on the determined range information.

Advantageously, embodiments describe an optical system that compresses the large FOV angles, such that the equivalent range of angles incident on the optical shutter of the LIDAR system is below a minimum angle that will produce an interference pattern in a detected image when the angle is propagated through the birefringent material of the LIDAR system. By using an optical system in this manner, embodiments can provide a LIDAR system that operates beyond the birefringence limited FOV to angles of 120° or more, significantly expanding the utility of existing LIDAR systems based on EO shutters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A light detection and ranging (LIDAR) system, comprising:
an optical system configured to:

receive optical pulses reflected from an environment and comprising a first set of angles; and compress the first set of angles into a second set of angles that are below a threshold angle;

a first polarizer arranged at an output of the optical system, the first polarizer configured to receive the optical pulses comprising the second set of angles and output polarized optical pulses;

a polarization modulator arranged at an output of the first polarizer and comprising a birefringent material that has at least a first order electro-optic effect, the polarization modulator configured to receive the polarized optical pulses and modify a polarization state of each of the polarized optical pulses, wherein the threshold angle is set to an angle at or below a maximum angle that can propagate through the birefringent material without producing an interference pattern in images of the environment;

a second polarizer arranged at an output of the polarization modulator, the second polarizer configured to receive the polarized optical pulses with the modified polarization states and output intensity modulated optical pulses; and one or more image sensors configured to generate images of the environment based on the intensity modulated optical pulses.

2. The LIDAR system of claim 1, wherein the threshold angle is determined based on the birefringent material in the polarization modulator.

3. The LIDAR system of claim 1, wherein the first set of angles comprises one or more angles above the threshold angle.

4. The LIDAR system of claim 1, wherein the birefringent material comprises lithium tantalate (LiTaO$_3$), lithium niobate (LiNbO$_3$), or potassium dideuterium (KD*P).

5. An optical receiver, comprising:
an optical shutter comprising a birefringent material;
an optical system arranged adjacent to the optical shutter, wherein:
the optical system is configured to (i) receive optical signals having a first set of angles from objects in an environment and (ii) compress the first set of angles into a second set of angles below a threshold angle associated with the birefringent material; and
the optical shutter is configured to receive the optical signals with the second set of angles, wherein the threshold angle is set to an angle at or below a maximum angle that can propagate through the birefringent material without producing an interference pattern; and
at least one image sensor configured to generate an image of the environment based on the optical signals that pass through the optical shutter.

6. The optical receiver of claim 5, wherein the birefringent material is configured to generate one or more interference patterns in an image of the environment when an optical signal having an angle above the threshold angle propagates through the birefringent material.

7. The optical receiver of claim 5, wherein the first set of angles comprises one or more angles above the threshold angle.

8. The optical receiver of claim 5, wherein the optical system comprises a plurality of lenses.

9. The optical receiver of claim 8, wherein the plurality of lenses are arranged at an input of the optical shutter and comprise at least one fisheye lens.

10. The optical receiver of claim 8, wherein a first lens of the plurality of lenses is arranged at an input of the optical shutter and a second lens of the plurality of lenses is arranged at an output of the optical shutter.

11. The optical receiver of claim 10, wherein the second lens is configured to form an image of the optical signals that propagate through the optical shutter in an image plane of the at least one image sensor.

12. The optical receiver of claim 5, wherein the optical system is configured to allow for a distance between the optical system and the at least one image sensor that is sufficient to accommodate at least the optical shutter.

13. The optical receiver of claim 12, wherein the optical shutter comprises:
a polarization modulator comprising the birefringent material;
a first polarizer arranged at an input of the polarization modulator; and
a second polarizer arranged at an output of the polarization modulator.

14. The optical receiver of claim 13, wherein the second polarizer is a polarizing beam splitter.

15. The optical receiver of claim 5, further comprising an optical filter arranged at an output of the optical system and at an input of the optical shutter, the optical filter being configured to permit only light with substantially the same wavelength as the optical signals with the second set of angles to enter into the optical shutter.

16. A method for increasing a field-of-view (FOV) of a light detection and ranging (LIDAR) system comprising an optical system and an optical shutter, the method comprising:
receiving, at the optical system, optical signals reflected from an environment and comprising a first range of angles;
compressing, via the optical system, the first range of angles into a second range of angles that are below a threshold angle, wherein the optical shutter comprises a birefringent material that generates one or more interference patterns in an image when an optical signal having an angle above the threshold angle propagates through the birefringent material;
controlling the optical shutter to modify polarization states of the optical signals with the second range of angles as the optical signals propagate through the optical shutter; and
generating a first image of the environment, based in part on the optical signals output from the optical shutter with the modified polarization states.

17. The method of claim 16, wherein the optical system comprises a plurality of lenses arranged at an input of the optical shutter.

* * * * *